US011992790B2

(12) United States Patent
Wei

(10) Patent No.: US 11,992,790 B2
(45) Date of Patent: May 28, 2024

(54) FILTRATION SYSTEM WITH ROTATING CORE DRIVING THIMBLE OPENING AND CLOSING WATER PASSAGE

(71) Applicant: TIANJIN TIANCHUANG BEST PURE ENVIRONMENTAL SCIENCE AND TECHNOLOGY CO., LTD., Tianjin (CN)

(72) Inventor: Enyu Wei, Tianjin (CN)

(73) Assignee: TIANJIN TIANCHUANG BEST PURE ENVIRONMENTAL SCIENCE AND TECHNOLOGY CO., LTD., Tianjin (CN)

( * ) Notice: Subject to any disclaimer, the term of this patent is extended or adjusted under 35 U.S.C. 154(b) by 1007 days.

(21) Appl. No.: 16/356,193

(22) Filed: Mar. 18, 2019

(65) Prior Publication Data
US 2020/0047095 A1 Feb. 13, 2020

(30) Foreign Application Priority Data

Aug. 7, 2018 (CN) .......................... 201810892143.6
Aug. 7, 2018 (CN) .......................... 201821265781.7

(51) Int. Cl.
*B01D 35/30* (2006.01)
*B01D 27/08* (2006.01)
(Continued)

(52) U.S. Cl.
CPC .............. *B01D 35/30* (2013.01); *B01D 27/08* (2013.01); *B01D 27/106* (2013.01); *B01D 29/90* (2013.01);
(Continued)

(58) Field of Classification Search
CPC ...... B01D 35/30; B01D 27/08; B01D 27/106; B01D 35/0276; B01D 35/12; B01D 35/153; B01D 39/2062; B01D 2201/16; B01D 2201/296; B01D 2201/304; B01D 2201/34; B01D 2201/347; B01D 2201/4015; B01D 2201/4061; B01D 29/33; B01D 29/90; B01D 2201/303; B01D 35/157; B01D 35/1573; B01D 2201/302; F25B 43/003; F25B 2500/221; C02F 2201/004; C02F 2201/005
See application file for complete search history.

(56) References Cited

U.S. PATENT DOCUMENTS 5,336,406 A * 8/1994 Stanford .............. B01D 35/153
  210/443
11,534,704 B2 * 12/2022 Reckin ................... B01D 27/08
(Continued)

*Primary Examiner* — Robert J Popovics

(57) ABSTRACT

A filtration system with a rotating core driving thimble opening and closing water passage, including: a casing, a filter and a connector, wherein the filter and the connector are connected and fixed in the casing; the filter includes a filter element body and a carbon rod; the connector includes a connector core, a water intake thimble, a water outtake thimble; the connector core is provided with a water inlet boss on which a first arc groove is provided, and a water outlet boss on which a second arc groove is provided; the water intake thimble and the water outtake thimble are lifted and falls through the rotation of the connector core, so that a water intake passage and a water outtake passage are opened and closed.

9 Claims, 13 Drawing Sheets

Figure 1:
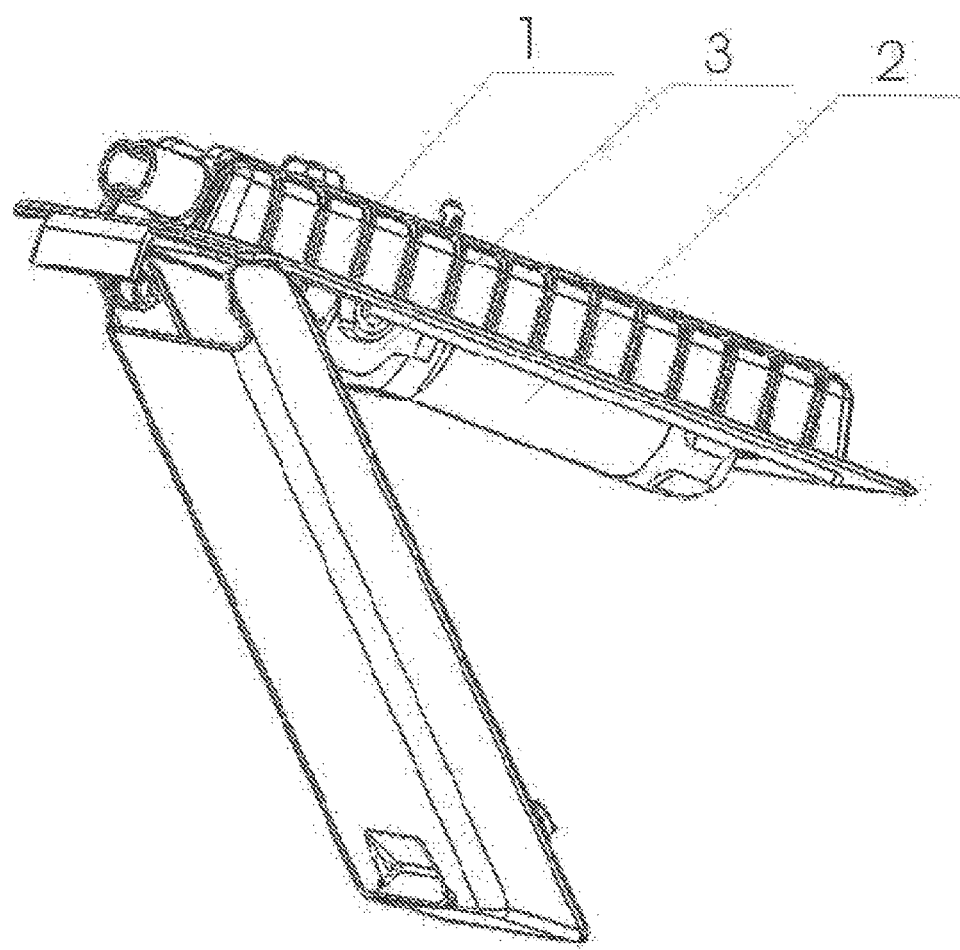

(51) Int. Cl.
  *B01D 27/10*   (2006.01)
  *B01D 29/33*   (2006.01)
  *B01D 29/90*   (2006.01)
  *B01D 35/027*  (2006.01)
  *B01D 35/12*   (2006.01)
  *B01D 35/153*  (2006.01)
  *B01D 39/20*   (2006.01)
  *F25B 43/00*   (2006.01)

(52) U.S. Cl.
  CPC ......... *B01D 35/0276* (2013.01); *B01D 35/12* (2013.01); *B01D 35/153* (2013.01); *F25B 43/003* (2013.01); *B01D 29/33* (2013.01); *B01D 39/2055* (2013.01); *B01D 39/2062* (2013.01); *B01D 2201/16* (2013.01); *B01D 2201/167* (2013.01); *B01D 2201/296* (2013.01); *B01D 2201/302* (2013.01); *B01D 2201/303* (2013.01); *B01D 2201/304* (2013.01); *B01D 2201/34* (2013.01); *B01D 2201/347* (2013.01); *B01D 2201/4015* (2013.01); *B01D 2201/4061* (2013.01); *C02F 2201/004* (2013.01); *C02F 2201/005* (2013.01); *F25B 2500/221* (2013.01)

(56) References Cited

U.S. PATENT DOCUMENTS

| | | | |
|---|---|---|---|
| 11,662,138 B2* | 5/2023 | Mercer | F25D 23/126 62/312 |
| 2006/0254971 A1* | 11/2006 | Tubby | B01D 35/153 210/235 |
| 2010/0170841 A1* | 7/2010 | An | B01D 35/30 137/511 |
| 2016/0101989 A1* | 4/2016 | An | C02F 1/003 210/254 |
| 2016/0136547 A1* | 5/2016 | Nuss | C02F 1/003 210/91 |
| 2018/0015399 A1* | 1/2018 | Park | C02F 1/001 |

* cited by examiner

FILTRATION SYSTEM WITH ROTATING CORE DRIVING THIMBLE OPENING AND CLOSING WATER PASSAGE

TECHNICAL FIELD

The invention relates to the field of refrigerator filtration, and in particular to a filtration system with a rotating core driving thimble opening and closing water passage.

TECHNICAL BACKGROUND

At present, a refrigerator filter and a refrigerator connecting device are in multi-spiral guide locking, and both are made of plastic products, the filter wears the locking position of the connecting device when the filter is rotated, as the number of the filter's replacements increases, a gap between the filter and the connecting device becomes larger, when the pressure of a water supply pipeline is too large, the axial position of the two is displaced, and the connecting device is prone to leakage, which affects the reliability of a filtration system.

Furthermore, at present, a water inlet and a water outlet of the refrigerator filter are in the same axial position, so as to prevent pre-filtration water and post-filtration water from being mixed by a sealing O-ring, if the cooperation between the sealing ring and a connector has a problem, inner leakage will occur, so that the pre-filtration water pollutes the post-filtration water, reducing the filtration efficiency of the filter.

SUMMARY

According to above technical problems, the present invention provides a filtration system with a rotating core driving thimble opening and closing water passage, comprising: a casing, a filter and a connector, wherein the filter and the connector are connected and fixed in a cavity of the casing, the casing consists of an upper cover of the casing and a lower cover of the casing, which are connected via a connecting member.

The filter consists of a filter body, a filter element end cover, a carbon rod, a carbon rod cover, a carbon rod bottom, a carbon rod cover sealing ring, a filter element water intake sealing ring and a filter element water outtake sealing ring, the lower cover of the casing is provided with a cavity, a filter element body and a connector are mounted in the cavity, the filter element body is connected to the connector, the lower cover of the casing is provided with a connecting member, the lower cover of the casing is connected to the upper side of the casing through the connecting member; the filter element body has a barrel-shaped structure, the carbon rod is mounted in the inner side of a barrel body, a carbon rod bottom is mounted at the rear side of the carbon rod, the carbon rod cover is mounted at the top of the carbon rod, the carbon rod cover sealing ring is fixed at the carbon rod cover, the carbon rod bottom is located inside the filter element, one end of the carbon rod bottom is provided with an inner cavity, and the other end thereof is provided with an annular rib position, the inner cavity is connected to the carbon rod, the annular rib position is located inside the end cover and embedded into a rib position with, the filter element end cover is mounted in the rear side of the filter element body, one end of the carbon rod cover has a boss, and the other end thereof has the cavity, a through hole penetrating the two ends and annular rib positions uniformly distributed at four positions are provided at the center thereof, the groove is provided on the boss for mounting the carbon rod cover sealing ring, a cavity forming filter element formed with a filter element water outlet 2-2 internally forms a sealing structure of a sealing carbon rod, the end face of the cavity is connected to the carbon rod, the through hole penetrating two ends at the center thereof is configured to the passage of the post-filtration water, the annular rib positions uniformly distributed at the four positions are in contact with the inner cavity of the filter element body for defining the overall position of the carbon rod cover, a cavity forming filter element formed by the carbon rod cover sealing ring and the filter element outlet of the groove on the boss of the carbon rod cover internally forms a sealing structure for sealing the carbon rod.

A water outlet is provided at the front side of the filter element body, a water inlet is provided at the circumference of the water outlet, the filter element water outtake sealing ring is mounted at the water outlet, the water element intake sealing ring is mounted in the water inlet; the water inlet is a set of hole-shaped holes, which are arranged in a ring shape on the second platform at the top of the filter element body, located below the water outlet, located on a water element intake sealing ring groove, and the water inlet is configured to the entering of the pre-filtration water into the filter element.

The water outlet is located on the boss at the top of the filter element body for the post-filtration water to flow out of the filter element and enter into the connector, the cavity formed by the filter element water outlet cooperates with the carbon rod of carbon rod cover and a sealer to form a sealing structure, the cavity internally formed by the filter element water inlet cooperates with the carbon rod cover sealing ring to seal the pre-filtration water and the post-filtration water to prevent the short circuit of the water passage.

The connector consists of a connector body, a connector core, a connector bottom cover, a connector bracket, a connector water intake sealing ring, a connector water outtake sealing ring, a water intake thimble sleeve, a water outtake thimble sleeve, a water intake thimble sealing ring, a water outtake thimble sealing ring, a water intake thimble, a water outtake thimble, a water intake spring, a water outtake spring, a water intake sealing ring, a water outtake sealing ring, a water intake cover board, a water outtake cover board, a water intake clamp and a water outtake clamp, the connector bracket is provided thereon with a C-shaped groove, the connector body is mounted on the upper side of the connector bracket, a rotating shaft is mounted on the connector body, the rotating shaft is mounted in the C-shaped groove, the rotating shaft is located at the two sides of the connector body, the axis thereof is perpendicular to the axis of the connector body, the rotating shaft cooperates with the C-shaped groove of the connector bracket, the axis of the rotating shaft of the connector body is coaxial with the C-shaped groove, can be rotated along the axis, and can drive the connector and the filter element to oscillate integrally along an arc line; the connector body is provided with a water inlet cavity, a water outlet cavity, a water intake thimble cavity, a water outtake thimble cavity, the rotating shaft, a core cavity, a connecting flange and a flange positioning block, the connector body is connected to the connector core, the connector core is located in an inner cavity of the connector body, and is sealed by the water intake sealing ring and the water outtake sealing ring, the connector core has the groove and the boss thereon, the connector core, the water intake thimble and the water outtake thimble are tightly pressed by the spring, the connector core is provided with a water inlet boss on which an arc-shaped groove is provided, the water intake thimble is pushed up by the rotation of the core, the connector core is provided with a water outlet boss on which an arc-shaped groove is provided, the water outtake thimble is pushed up by the rotation of the core, one side of the connector body is provided with the water inlet and the water outlet, the water inlet is connected to the water intake cover board, the water intake sealing ring is arranged between the water inlet and the water intake cover board, the water intake cover board is connected to the water intake clamp, the water intake thimble cavity is arranged in the water inlet, the water intake thimble sleeve, the water intake thimble sealing ring, the water intake thimble and the water intake spring are mounted in the water intake thimble cavity, the water intake thimble is rotated through the connector core, the thimble is lifted and fell through the water inlet boss and the groove and by the action of the water intake spring, so that the water passage is opened and closed; the water outlet is connected to the water outtake cover board, the water outtake sealing ring is arranged between the water outlet and the water outtake cover board, the water outtake cover board is connected to the water outtake clamp, the water outlet is provided therein with the water outtake thimble sleeve, the water outtake thimble sealing ring, the water outtake thimble and the water outtake spring, the water outtake thimble is rotated through the connector core, the thimble is lifted and fell through the water outlet boss and the groove and by the action of the water outtake spring so that the water passage is opened and closed.

The connector bottom cover is at a lower portion of the connector body, the connector bottom cover is provided with a groove flange, the groove flange is attached to a connecting flange of the connector body, the connector bottom cover has two notches attached to a body flange positioning block, a connector bottom cover groove flange has two buckle grooves thereon and snap-fitted to prevent the connector bracket, preventing the connector and the filter from falling due to gravity, the connector water outtake sealing ring is mounted in the two grooves of the connector core, respectively, a water intake sealing ring is located in the lower groove, and a water outtake sealing ring is located in the upper groove.

The outer portion of the upper cover of the casing has a trapezoidal three-dimensional shape, and the bottom thereof has a rectangular plate-like edge, the upper portion of the trapezoidal three-dimensional shape has laterally and longitudinally distributed reinforcing ribs, the upper plane thereof faces the opposite direction of the ground surface, the outer cover of the casing is provided with two bosses, one boss is in the central region, and the other one is at one side of the central region, and the centers of the two bosses are on one axis, and the two axes are parallel to the edge of the bottom rectangular plate-shaped edge, the boss at the central region consists of a circular boss and a cross-shaped reinforcing rib, the boss on one side of the central portion consists of the circular boss and an 1-shaped reinforcing rib, one side of the trapezoidal three-dimensional shape is provided with a hollow boss, the hollow boss consists of two circular shapes, the hollow boss and the trapezoidal three-dimensional shape form the cavity through which the refrigerator water intake pipe and the refrigerator water outtake pipe are connected to the water inlet and the water outlet of the connector of the filtration system.

The bottom of the upper cover of the casing has a trapezoidal three-dimensional concave structure, the concave structure is the cavity of the upper cover of the casing, the cavity is configured to accommodate the upper portions of the filter and the connector, two blind holes are provided in the cavity, the central region and one side thereof, the two blind holes are connected to the connector bracket via a screw, the backs of the two blind holes are a cross-shaped protrusion and a 1-shaped protrusion, respectively; the side of the cavity of the upper cover of the casing is provided with two trapezoidal three-dimensional bosses, and the two bosses are located on the longer concave boundary; the two bosses are configured to the snap-fitting with a C-shaped protrusion of the lower cover of the casing for tightly clamping the lower cover of the casing.

The lower cover of the casing has a trapezoidal three-dimensional concave thin plate structure, and the structure consists of four faces, which are a long face A, a long face B, a ground surface and a short face, one end of the trapezoidal three-dimensional concave thin plate structure is opened, one end of the long face A and the long face B which is opened is provided with two bosses, and the two bosses have the two blind holes, respectively; the lower cover of the casing is the long face A, the portion of the long face B close to the short face has two C-shaped buckles for connecting and tightly clamping two trapezoidal cubes of the upper cover of the casing to prevent the lower cover of the casing from falling off due to the own weight thereof; the lower cover of the casing has a shaft hole for connecting the shaft of an inner casing of the refrigerator, the lower cover of the casing can be rotated clockwise and counterclockwise along the axis so that the lower cover of the casing is opened and closed; the filter element water intake sealing ring groove is located under the water inlet for installing the filter element water intake sealing ring and cooperating with the inner cavity of the connector core to seal the pre-filtration water; the filter element water outtake sealing groove is located on the circumference of a filter element body boss for installing the filter element water outtake sealing ring and cooperating with the top of the inner cavity of the connector core to seal the post-filtration water.

An end cover welding stop port is provided at an opening of the filter element end cover, and an inner rib position is provided at the inner side thereof, a wrench is mounted at an anti-slip thread and the rear side of the filter element end cover, the filter element end cover is provided thereon with the anti-slip thread; the end cover welding stop port is located at an opening end of the end cover, cooperates with a body welding stop port and is dissolved with the body welding stop, and the axes of the end cover welding stop port and the body welding stop port are the same the end cover inner rib positions are evenly distributed inside the filter element end cover for supporting the carbon rod bottom rib position, and the carbon rod bottom rib position and an end cover rib position are embedded with each other.

The connecting flange is located on the circumference of the boss at the top of the filter element body, the lower end face of the connecting flange cooperates with the end face of the bottom cover of the connector for preventing the filtration system from coming out when the filtration system is under pressure.

The present invention has the beneficial effects that the present invention improves the internal leakage phenomenon caused by the inner core wearing of the filtration system, the inner core drives the thimble to prevent the water from flowing out when the filter is disassembled. the cavity formed by the filter element water outlet of the present invention cooperates with the carbon rod of the carbon rod cover and the sealer to form a sealing structure to avoid the occurrence of internal leakage, the cavity internally formed by the filter element water inlet cooperates with the carbon rod cover sealing ring for sealing the pre-filtration water and the post-filtration water to prevent the short circuit of the water passage.

The connecting flange of the present invention is located on the circumference of the boss at the top of the filter element body, the lower end face of the connecting flange cooperates with the end face of the connector bottom cover for preventing the filtering system from coming out when the filtering system is under pressure. Two buckle grooves on the groove flange of the connector bottom cover cooperates with a buckle of the connector bracket to prevent the connector and the filter from falling due to gravity.

The present invention drives the connector core through the rotation of the filter and raises the position of the thimble of the water inlet and the water outlet of the connector to open the water outlet and the water inlet so that the connector and the filter element water passage are opened and closed. According to the present invention, the connector is fixed to the filter element by tightly clamping the buckle groove on the connector and the buckle on the connector bracket. When installed, the filter is inserted into the connector to turn clockwise until the filter is locked and the water passage is opened. The filter is lifted, and the connector is lifted by rotating the rotating shaft along the arc line so that the buckle and the buckle groove are tightly clamped, the lower cover of the casing is lifted along the arc line to be clamped with the upper cover of the casing. When disassembled, the lower cover of the casing is pressed down along the arc line to separate from the upper cover of the casing, the filter is pressed down, and the connector is pressed down by rotating the rotating shaft along the arc line, the filter is rotated counterclockwise, and the filter is removed from the connector. The present invention improves the internal leakage caused by the inner core wear of the filtration system, and the inner core drives the thimble to prevent the water from flowing out when the filter is disassembled.

The connector core of the present invention has the groove and the boss thereon, the connector core, the water intake thimble and the water outtake thimble are tightly pressed by the spring, when the connector is rotated, the water intake thimble and the water outtake thimble are raised from the position of the groove to the position of the boss, and the water passage is opened, when disassembled, the connector is lowered from the position of the boss to the position of the groove, and the water passage is closed, preventing the leakage of the connector water due to the removal of the filter element. When the filter is installed and disassembled, the water intake thimble and the water outtake thimble are lifted and lowered so that the water intake thimble sealing ring and the water outtake thimble sealing ring are attached to and separated from the water intake thimble sleeve and the water outtake thimble sleeve to perform the sealing. The worn areas caused by the opening, closing and sealing of the entire water passage are the heads of the water intake thimble and the water outtake thimble, an inner core groove and the boss. Due to the action of the spring, even if the water intake thimble and the water outtake thimble are worn seriously, the water intake thimble sealing ring and the water outtake thimble sealing ring are attached to the water intake thimble sleeve and the water outtake thimble sleeve, realizing the sealing and not causing a leakage phenomenon.

BRIEF DRAWINGS OF THE PRESENT INVENTION

Figure 2:
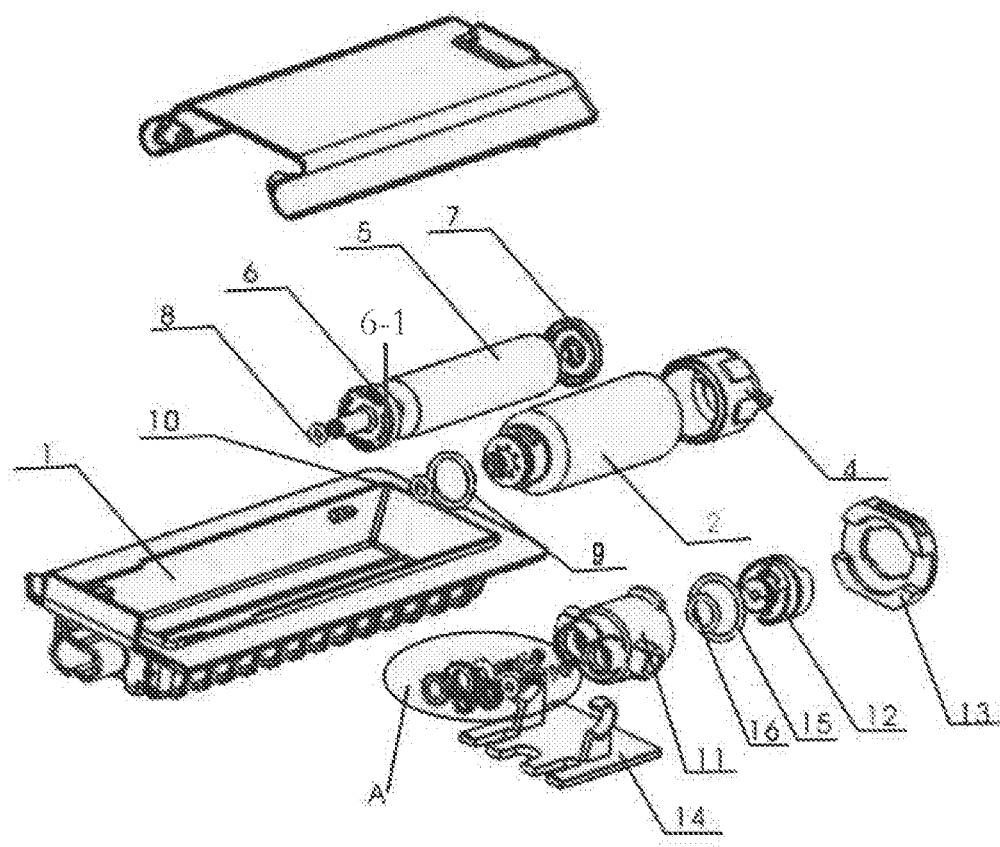
Figure 2A:
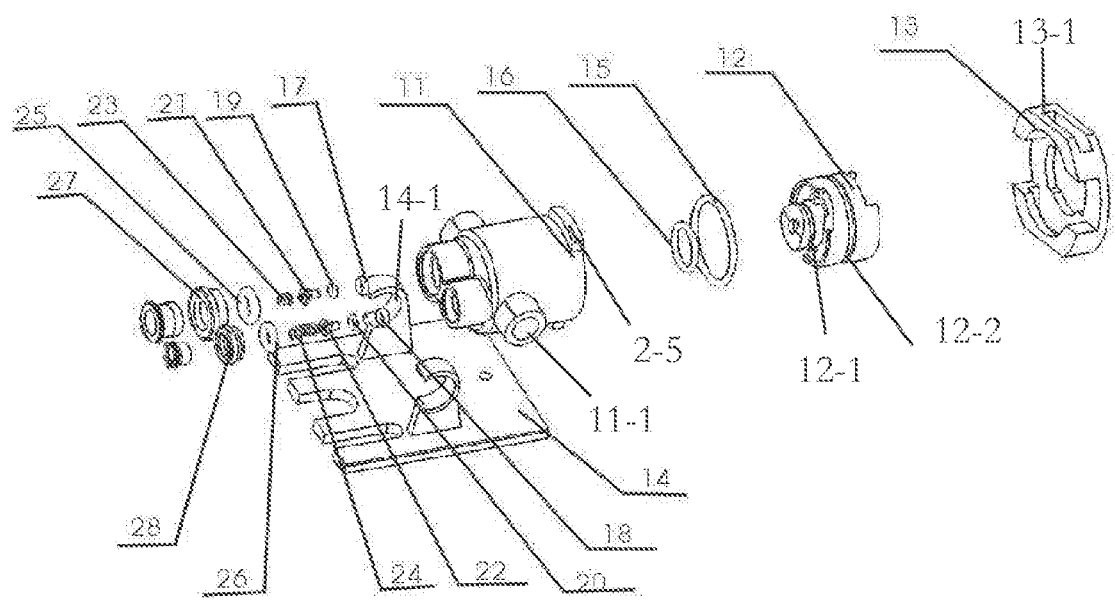
Figure 3:
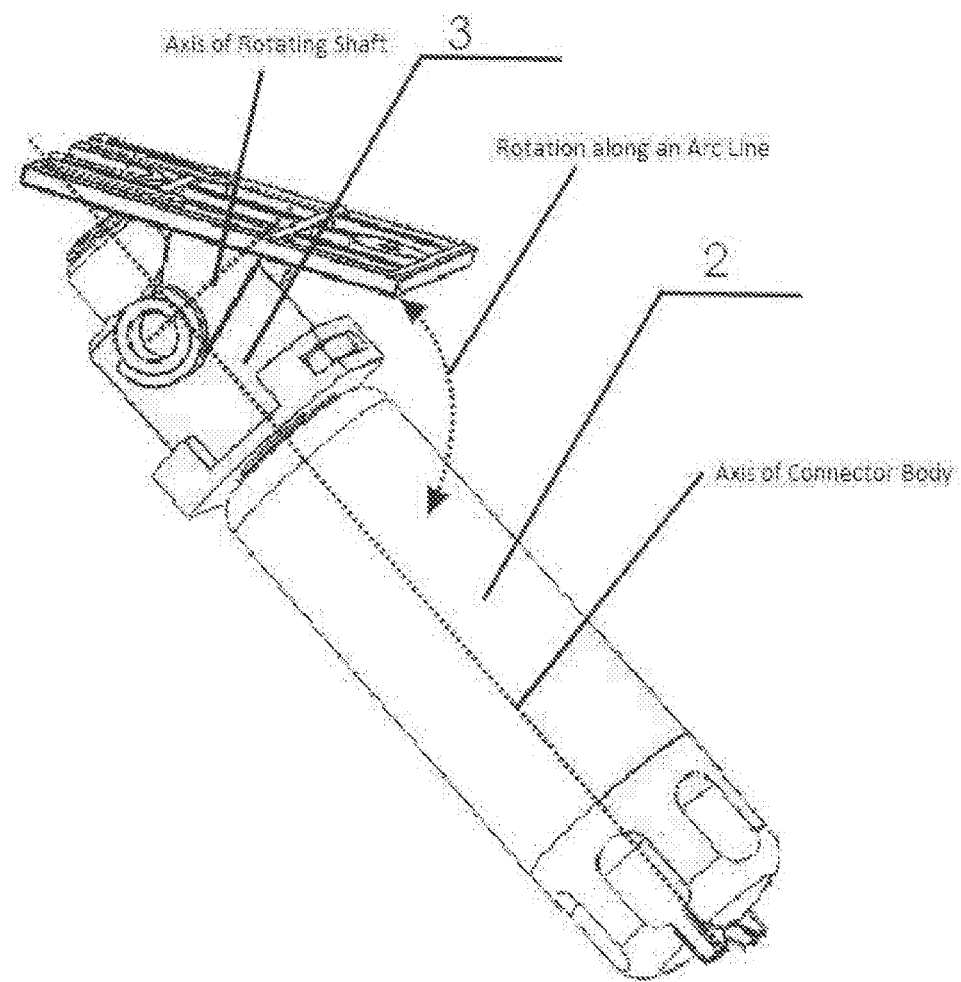
Figure 4:
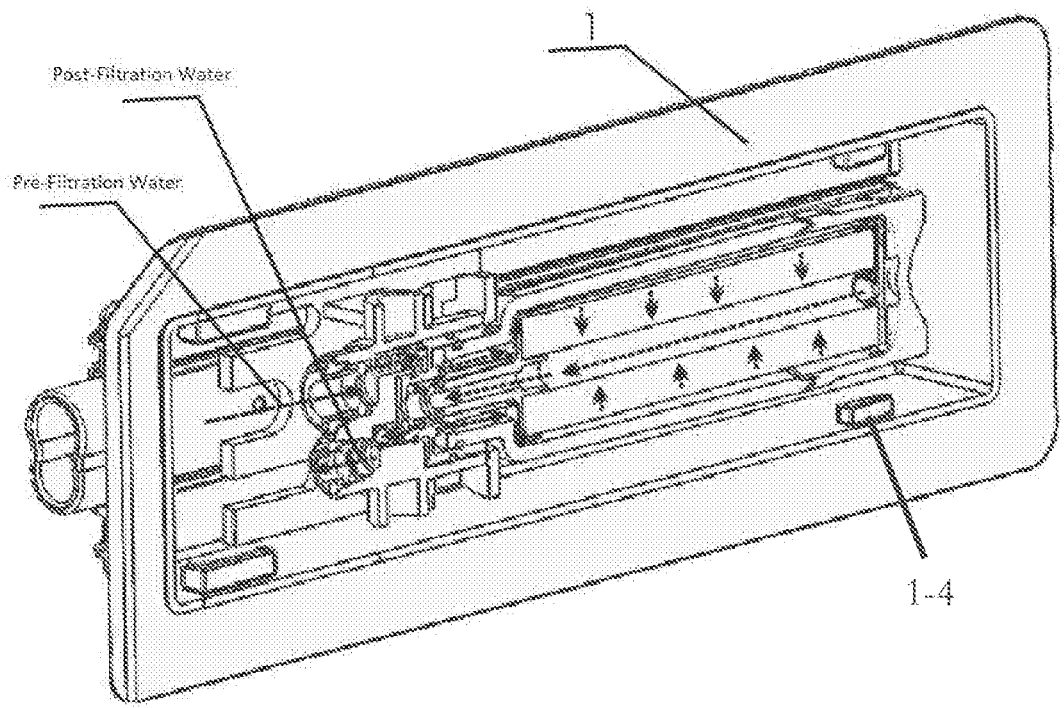
Figure 5:
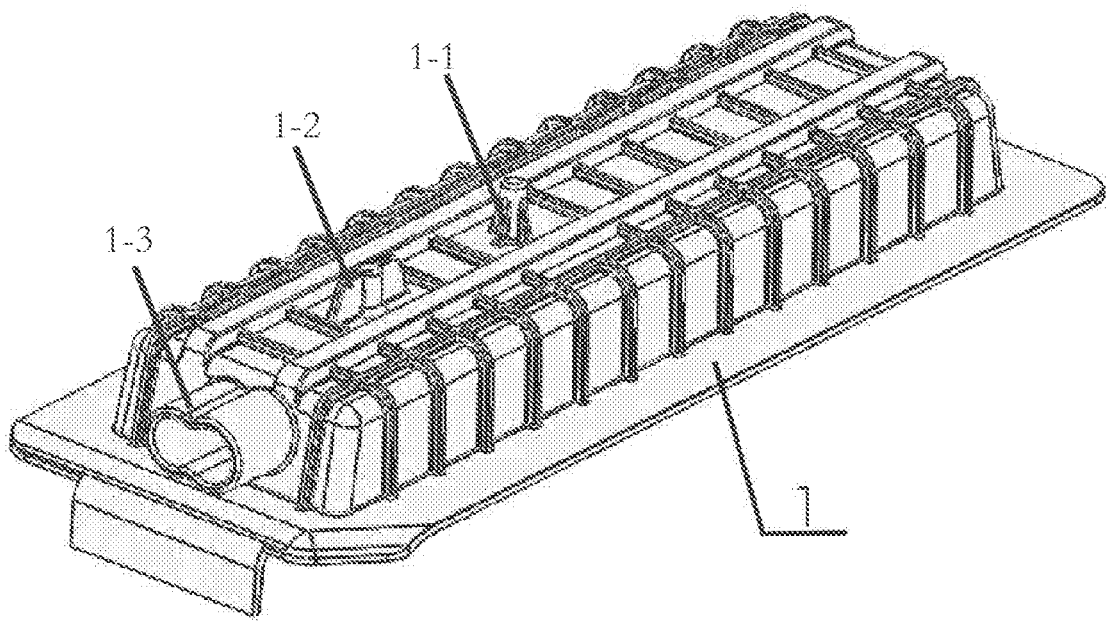
Figure 6:
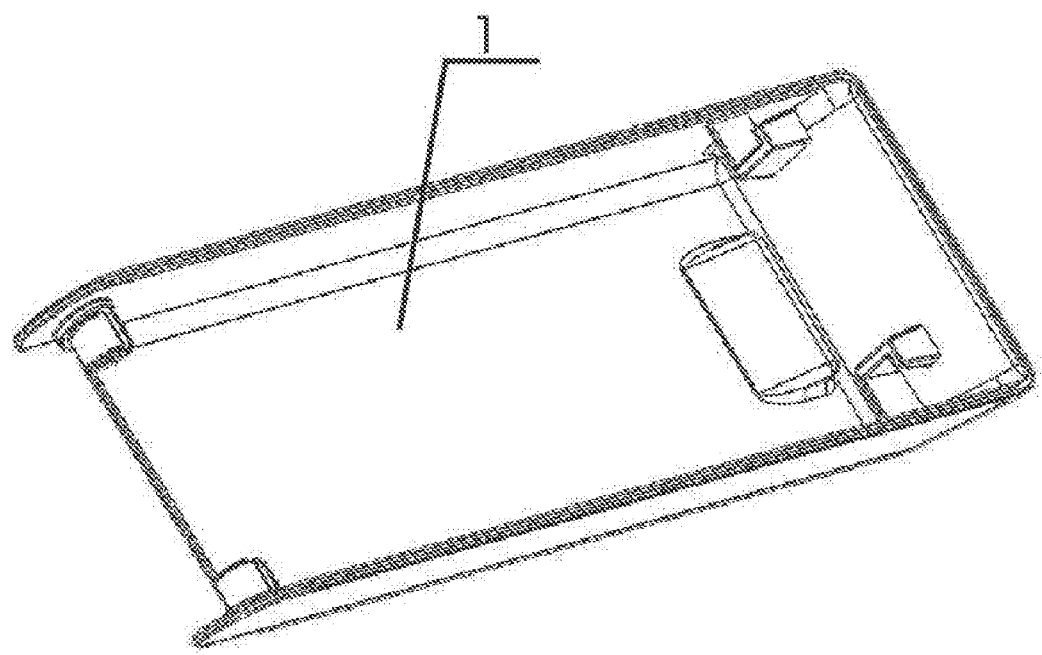
Figure 7:
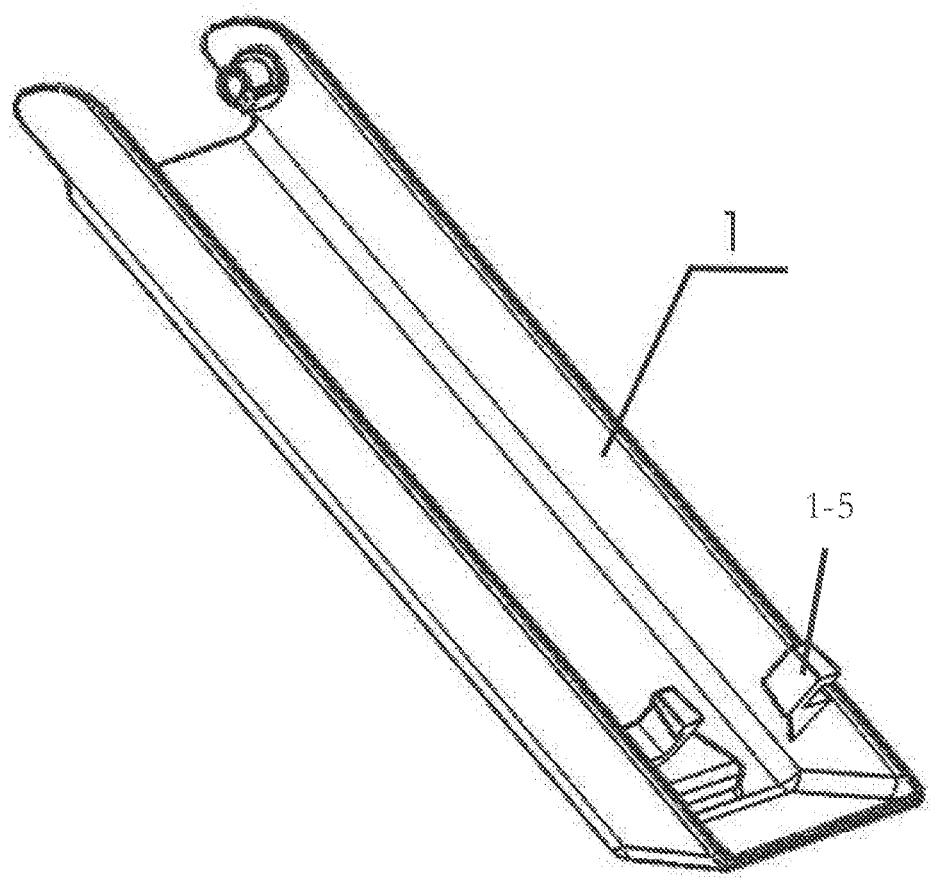
Figure 8:
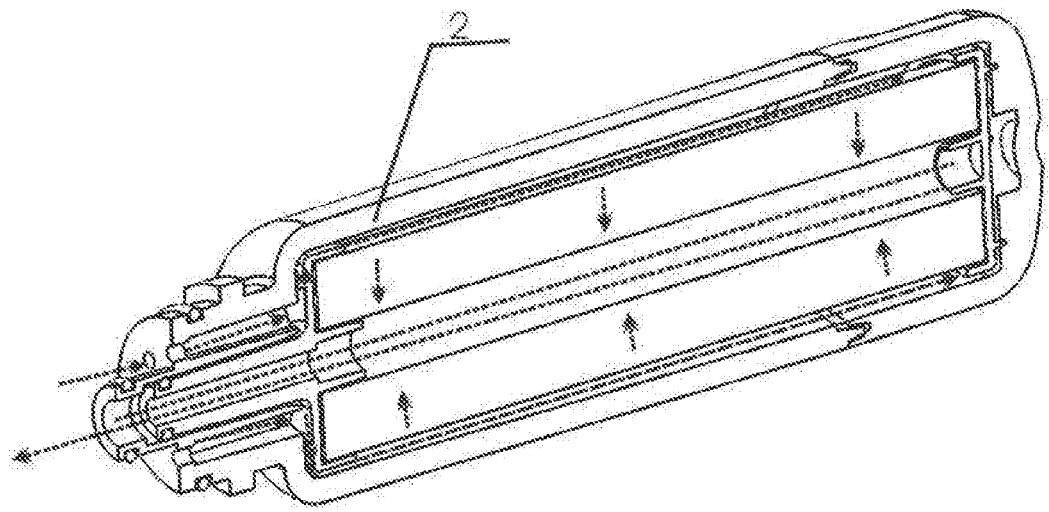
Figure 9:
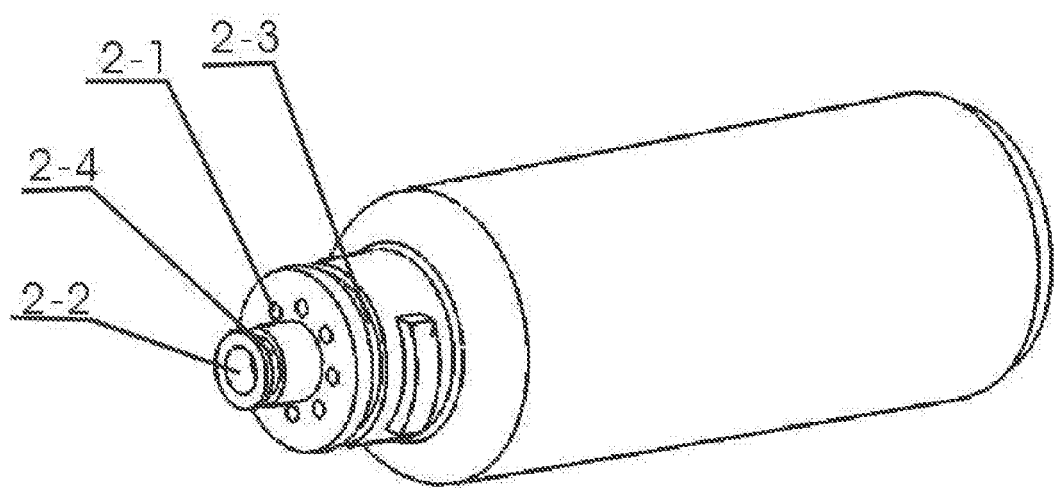
Figure 10:
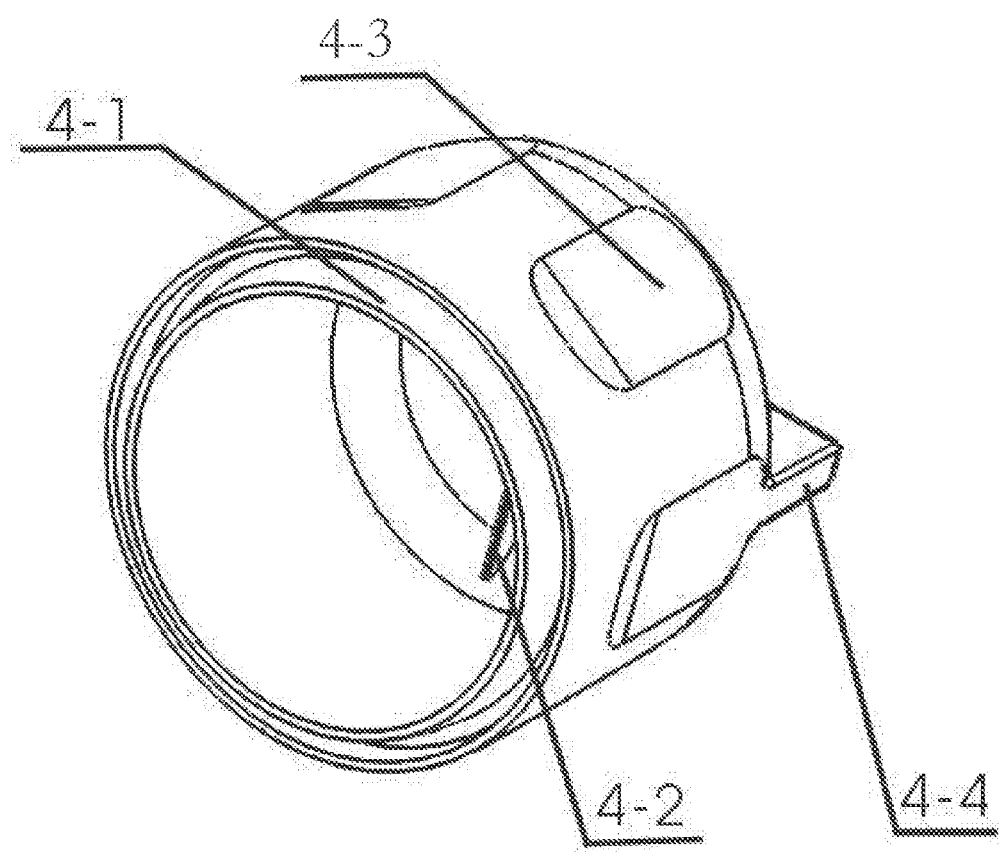
Figure 11:
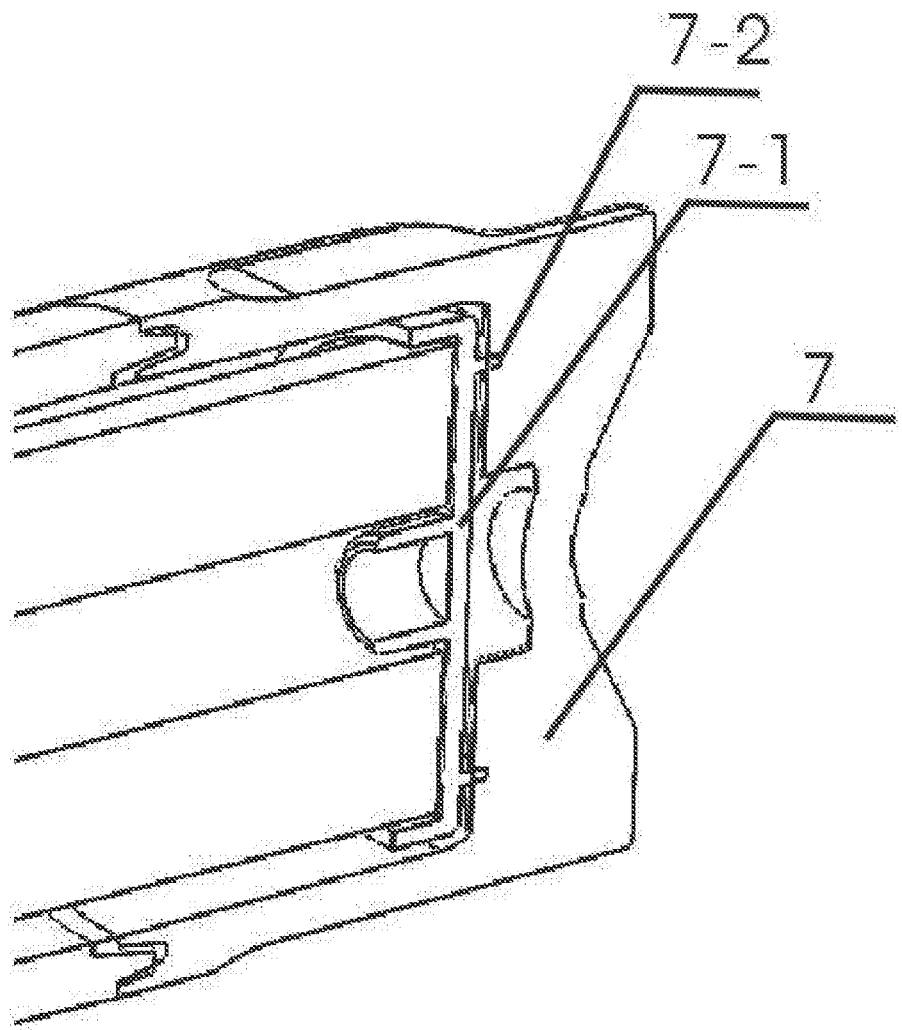
Figure 12:
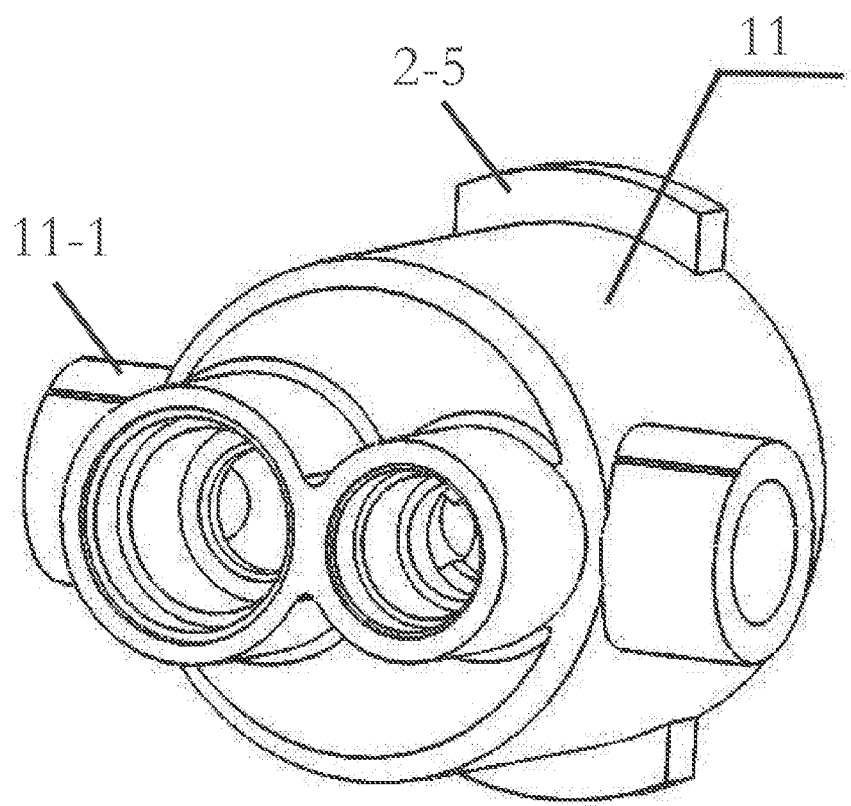
Figure 13:
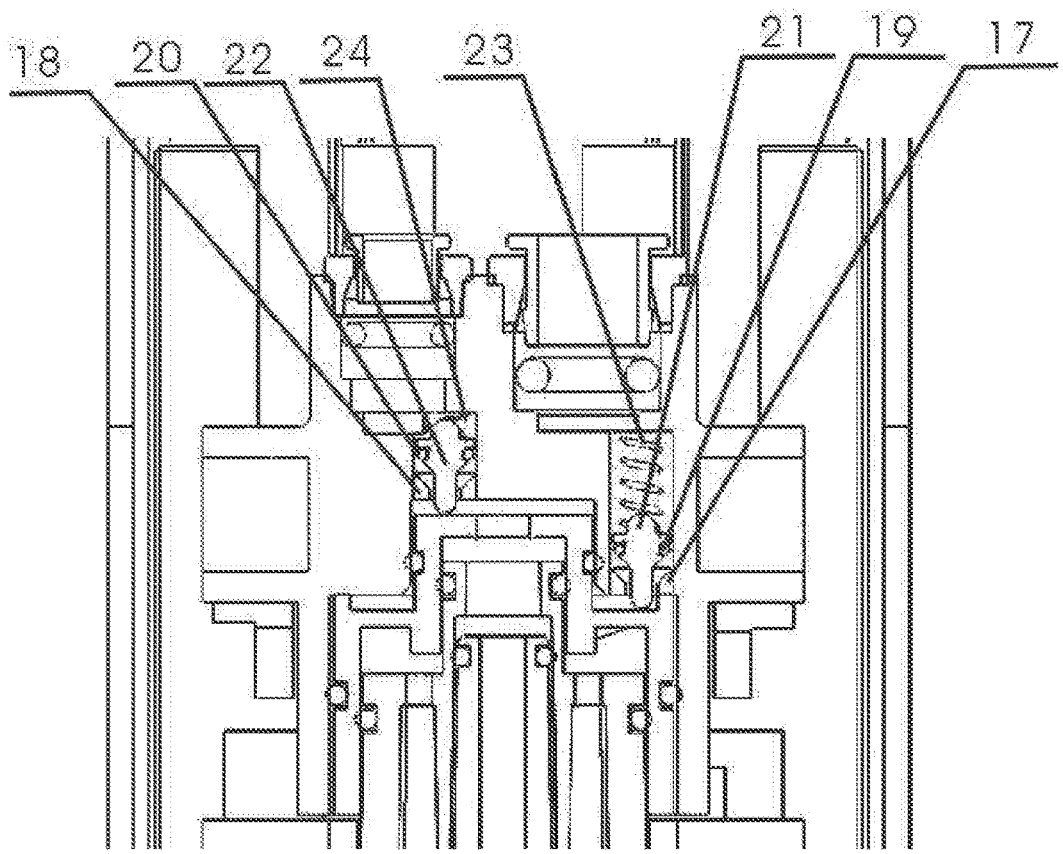
Figure 14:
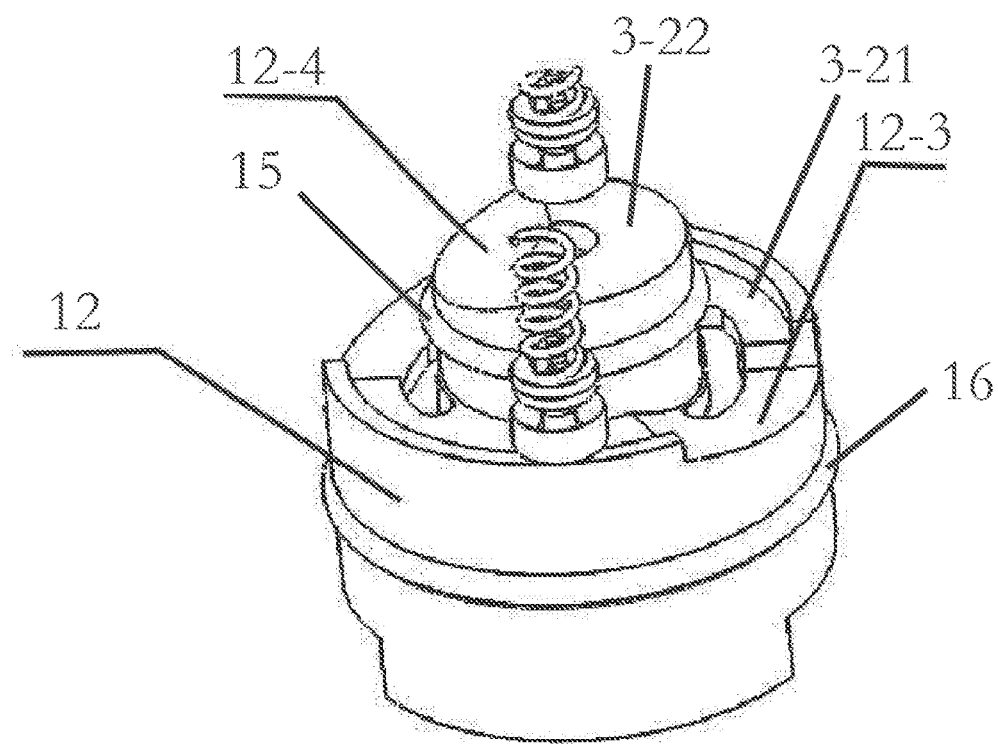
Figure 15:
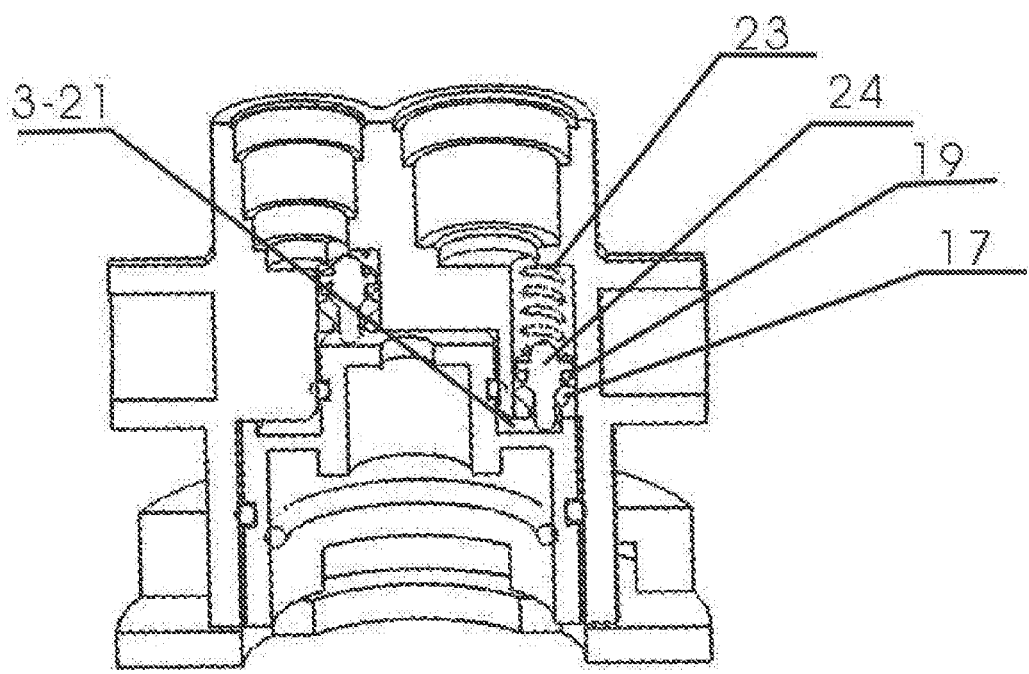
Figure 16:
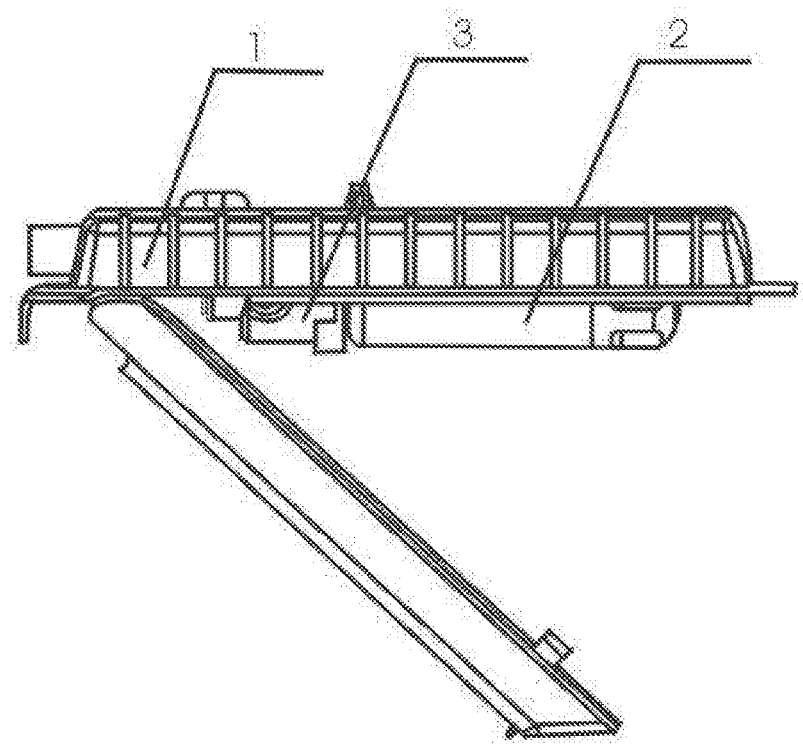
Figure 17:
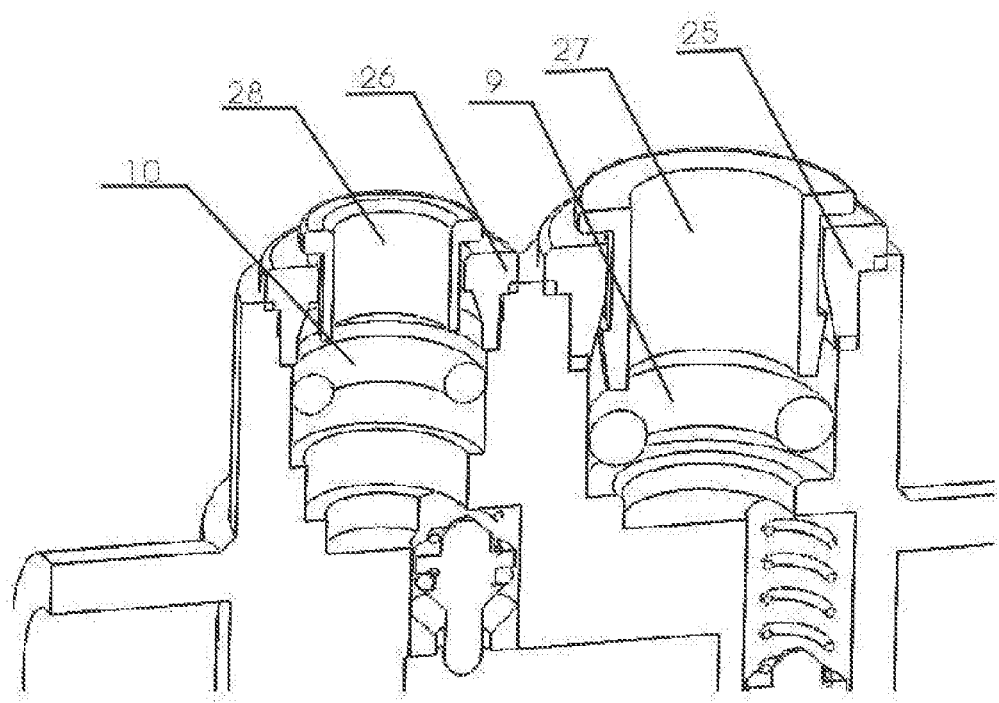
Figure 18:
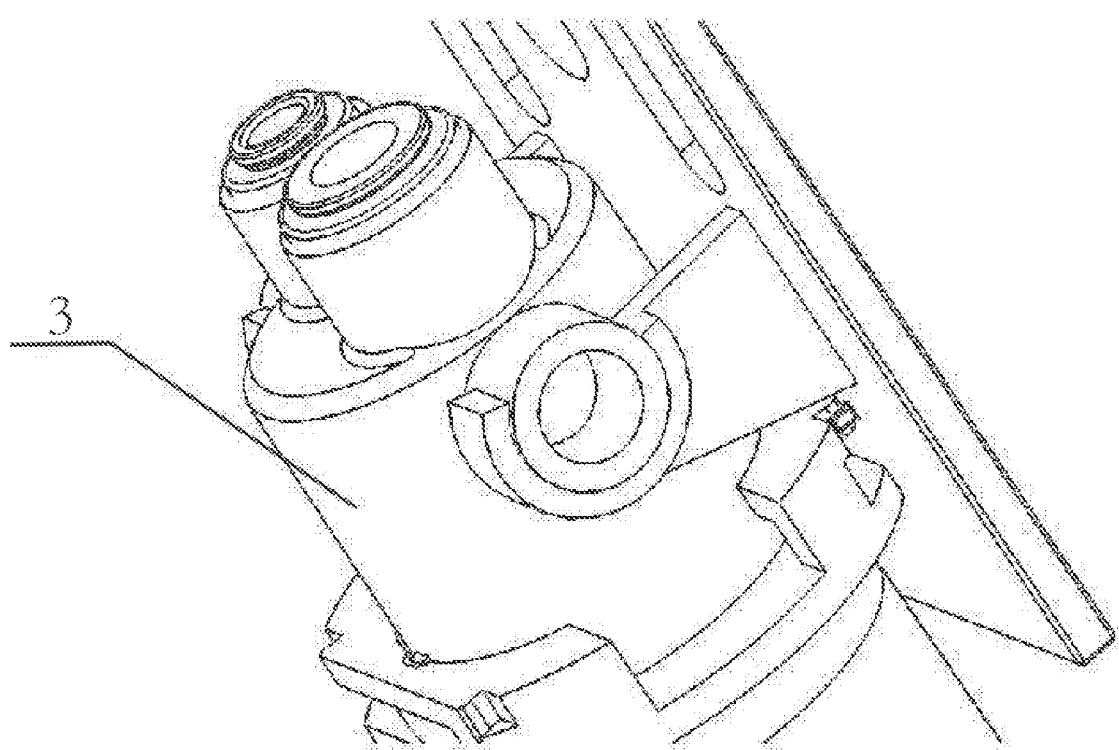

FIG. 1 is a structural view of the present invention.
FIG. 2 is an exploded view of the present invention.
FIG. 2A is an exploded view A of the present invention.
FIG. 3 is a structural view of a rotating filter of the present invention.
FIG. 4 is a sectional view of the present invention.
FIG. 5 is a structural view of an upper cover of a casing of the present invention.
FIG. 6 is a structural view of a lower cover of a casing of the present invention.
FIG. 7 is a structural view of a C-shaped buckle of the present invention.
FIG. 8 is a sectional view of a filter of the present invention.
FIG. 9 is a structural view of a filter of the present invention.
FIG. 10 is a structural view of an end cover of a filter element of the present invention.
FIG. 11 is a structural view of an annular rib of a carbon rod bottom according to the present invention.
FIG. 12 is a structural view of a connector body of the present invention.
FIG. 13 is a sectional view of a top end of a filter body of the present invention.
FIG. 14 is a structural view of a water outlet of the present invention.
FIG. 15 is a sectional view of a water inlet of the present invention.
FIG. 16 is a structural view of the present invention.
FIG. 17 is a structural view of an upper portion of a filter of the present invention.
FIG. 18 is a side structural view of a filter of the present invention.

As shown in the drawings, 1. Casing, 2. Filter, 3, Connector, 4. Filter Element End Cover, 5. Carbon Rod, 6. Carbon Rod Cover, 7. Carbon Rod Bottom, 8. Carbon Rod Cover Sealing Ring, 9. Filter Element Water Intake Sealing Ring, 10. Filter Element Water Outtake Sealing Ring, 11. Connector Body, 12. Connector Core, 13. Connector Bottom Cover, 14. Connector Bracket, 15. Connector Water Intake Sealing Ring, 16. Connector Water Outtake Sealing Ring, 17. Water Intake Thimble Sleeve, 18. Water Outtake Thimble Sleeve, 19. Water Intake Thimble Sealing Ring, 20. Water Outtake Thimble Sealing Ring, 21. Water Intake Thimble, 22. Water Outtake Thimble, 23. Water Intake Spring, 24. Water Outtake Spring, 25. Water Intake Cover Board, 26. Water Outtake Cover Board, 27. Water Intake Clamp, 28. Water Outtake Clamp, Water Inlet Boss 3-21, Water Outlet Boss 3-22. Water Inlet 2-1, Water Outlet 2-2, Filter Element Water Intake Sealing Ring Groove 2-3, Filter Element Water Outtake Sealing Ring Groove 2-4, Connecting Flange 2-5, End Cover Welding Stop Port 4-1, Inner Rib Position 4-2, Anti-Slip Thread 4-3, Wrench 4-4, Inner Cavity 7-1, first Annular Rib Position 7-2, second annular rib position 6-1, C-shaped groove 14-1, rotatable shaft 11-1, upper groove 12-1, lower groove 12-2, First arc groove 12-3, Second arc groove 12-4, cross-shaped reinforcing rib 1-1, 1-shaped reinforcing rib 1-2, hollow boss 1-3, trapezoidal three-dimensional boss 1-4, C-shaped buckle 1-5, groove flange 13-1.

DETAILED DESCRIPTION

The invention is further illustrated in accordance with the FIGS:

Embodiment 1

The invention provides a filtration system with a rotating core driving thimble opening and closing water passage, comprising a casing 1, a filter 2 and a connector 3, wherein the filter 2 and the connector 3 are connected and fixed in an inner cavity of the casing 1, the casing 1 consists of an upper cover of the casing 1 and a lower cover of the casing 1, which are connected via a connecting member; the filter 2 consists of a filter element body, a filter element end cover 4, a carbon rod 5, a carbon rod cover 6, a carbon rod bottom 7, a carbon rod cover sealing ring 8, a filter element water intake sealing ring 9 and a filter element water outtake sealing ring 10, the inner side of the lower cover of the casing 1 is provided with a cavity, the filter body and the connector 3 are mounted in the cavity, the filter body and the connector 3 are connected, the lower cover of the casing 1 is provided with a connecting member, the lower cover of the casing 1 is connected to the upper side of the casing 1 via the connecting member; the filter element body has a barrel-shaped structure, the carbon rod 5 is mounted at the inner side of a barrel body, a carbon rod bottom 7 is mounted at the rear side of the carbon rod 5, the carbon rod cover 6 is mounted at the top end of the carbon rod 5, a carbon rod cover sealing ring 8 is fixed on the carbon rod cover 6, the carbon rod bottom 7 is located inside the filter element, one end of the carbon rod bottom 7 has an inner cavity 7-1, and the other end thereof has a first annular rib position 7-2, the inner cavity 7-1 is connected to the carbon rod 5, the first annular rib position 7-2 and an end cover inner rib position 4-2 are embedded into each other, the filter element end cover 4 is mounted at the rear side of the filter element body, one end of the carbon rod cover 6 has a boss, and the other end thereof has a cavity, a through hole penetrating two ends and a second annular rib position 6-1 uniformly distributed at four positions are provided at the center thereof, the boss is provided thereon with a groove, the groove is configured to install the carbon rod cover sealing ring 8, a cavity forming filter element formed with a filter element water outlet 2-2 internally forms a sealing structure of a sealing carbon rod 5, the end face of the cavity is connected to the carbon rod 5, the through hole of which the center penetrates the two ends thereof is configured to the passage of post-filtration water, the second annular ribs 6-1 uniformly distributed at four positions is in contact with the inner cavity of the filter element body for defining the overall position of the carbon rod cover 6, the cavity forming filter element formed by the carbon rod cover sealing ring 8 and the filter element water outlet 2-2 of the groove on the boss of the carbon rod cover 6 internally forms the sealing structure of the sealing carbon rod 5; the front side of the filter element body is provided with the water outlet 2-2, a water inlet 2-1 is provided around the water outlet 2-2, the filter element water outtake sealing ring 10 is mounted at the water outlet 2-2, the filter element water intake sealing ring 9 is mounted at the water inlet 2-1; the water inlet 2-1 is a set of hole-shaped holes, which are arranged in a ring shape on two platforms at the top of the filter body, located below the water outlet 2-2, and located on the groove 2-3 of the filter element water intake sealing ring 9, and the water inlet 2-1 is configured to the entering of the pre-filtration water into the filter element.

The water outlet 2-2 is located on the boss at the top of the filter element body so that the post-filtration water flows out of the filter element and enters into the connector 3, the cavity formed by the filter element water outlet 2-2 cooperates with the carbon rod 5 of the carbon rod cover 6 and a sealer to form the sealing structure, the cavity internally formed by the filter element water inlet 2-1 cooperates with the carbon rod cover sealing ring 8 for sealing the pre-filtration water and the post-filtration water to prevent the short circuit of a water passage; the connector 3 consists of a connector body 11, a connector core 12, a connector bottom cover 13, a connector bracket 14, a connector water intake sealing ring 15, a connector water outtake sealing ring 16, a water intake thimble sleeve 17, a water outtake thimble sleeve 18, a water intake thimble sealing ring 19, a water outtake thimble sealing ring 20, a water intake thimble 21, a water outtake thimble 22, a water intake spring 23, a water outtake spring 24, a water intake sealing ring, a water outtake sealing ring, a water intake cover board 25, a water outtake cover board 26, a water intake clamp 27 and a water outtake clamp 28, the connector bracket 14 is provided thereon with a C-shaped groove 14-1, the connector body 14 is mounted at the upper side of the connector bracket 14, a rotatable shaft 11-1 is mounted on the connector body 11 and in the C-shaped groove 14-1, the rotatable shaft 11-1 is located at the two sides of the connector body 11, the axis of the rotatable shaft 11-1 is perpendicular to the axis of the connector body 11, the rotatable shaft 11-1 cooperates with the C-shaped groove 14-1 of the connector bracket 14, the axis of the rotatable shaft 11-1 of the connector body 11 is coaxial with the C-shaped groove 14-1, can be rotated along the axis, and can drive the connector 3 and the filter element to oscillate integrally along an arc line; the connector body 11 is provided with a cavity of the water inlet 2-1, a cavity of the water outlet 2-2, a cavity of the water intake thimble 21, a cavity of a water outtake thimble 22, the rotatable shaft 11-1, an core cavity, a connecting flange 2-5 and a flange positioning block; the connector body 11 is connected to the connector core 12, the connector core 12 is located in the inner cavity of the connector body 11, and is sealed by the water intake sealing ring and the water outtake sealing ring, the connector core 12 is provided thereon with the groove and the boss, and the connector core 12, the water intake thimble and the water outtake thimble 22 are pressed by the spring, the connector core 12 has a water inlet boss 3-21 on which a first arc groove 12-3 is provide, the water intake thimble 21 is pushed up via the rotation of the core, the connector core 12 has a water outlet boss 3-22 on which a second arc groove 12-4 is provided, the water outtake thimble 22 is pushed up by the rotation of the core, one side of the connector body 11 is provided with the water inlet 2-1 and the water outlet 2-2, the water inlet 2-1 is connected to the water intake cover board 25, the water intake sealing ring is arranged between the water inlet 2-1 and the water intake cover board 25, the water intake cover board 25 is connected to the water intake clamp 27, the water inlet 2-1 is provided therein with the cavity of the water intake thimble 21, a water intake thimble sleeve 17, the water intake thimble sealing ring 19, the water intake thimble 21 and the water intake spring 23 are mounted in the cavity of the water intake thimble 21, the water intake thimble 21 is rotated by the connector core 12, the thimble is lifted and fell through the water inlet boss 3-21 and the groove and by the action of the water intake spring 23, so that the water passage is opened and closed; the water outlet 2-2 is connected to the water outtake cover board 26, the water outtake sealing ring is arranged between the water outlet 2-2 and the water outtake cover board 26, the water outtake cover 26 is connected to the water outtake clamp 28, the water outlet 2-2 is provided therein with the cavity of the water outtake thimble 22, the water outtake thimble sleeve 18, the water outtake thimble sealing ring 20, the water outtake thimble 22 and the water outtake spring 24 are mounted in the cavity of the water outtake thimble, the water outtake thimble 22 is rotated through the connector core 12, the thimble is lifted and fell through the water outlet boss 3-22 and the groove and by the action of the water outtake spring 24, so that the water passage is opened and closed.

The connector bottom cover 13 is at the lower part of the connector body 11, and is provided with one groove flange, the groove flange is attached to a connecting flange 2-5 of the connector body 11, and the connector bottom cover 13 has two notches which are attached to a body flange positioning block, two buckle grooves on a groove flange of the connector bottom cover 13 are snap-fitted with the connector bracket 14 to prevent the connector 3 and the filter 2 from falling due to gravity, the connector water outtake sealing rings 16 is mounted in the two grooves of the connector core 12, respectively, the water intake sealing ring is located in a lower groove, and the water outtake sealing ring is located in an upper groove.

The outer portion of an upper cover of the casing 1 has a trapezoidal three-dimensional shape, and the bottom thereof has a rectangular plate-like edge, the upper portion of the trapezoidal three-dimensional shape has laterally and longitudinally distributed reinforcing ribs, the upper plane faces the opposite direction of the ground surface, the upper cover of the casing 1 has two bosses, one boss is provided at the central region, and the other one is provided at one side of the central region, the centers of the two bosses are on one axis, and the two axes are parallel to the edge of a bottom rectangular plate, the boss at the central region consists of a circular boss and a cross-shaped reinforcing rib, the boss on one side of the central region consists of a circular boss and an 1-shaped reinforced rib, one side of the trapezoidal shape has a hollow boss, the hollow boss consists of two circles, the hollow boss and the trapezoidal shape form the cavity through which a refrigerator water intake pipe and a refrigerator outtake pipe are connected to the water inlet and the water outlet 2-2 of the connector 3 of the filtration system.

The bottom of the upper cover of the casing 1 has a concave structure of a trapezoidal cube, the concave structure is the cavity of the upper cover of the casing 1, the cavity is configured to accommodate the filter 2 and the upper half of the connector 3, two blind holes are provided in the cavity and the central region and one side, the two blind holes are connected to the connector bracket 14 by a screw. the backs of the two blind holes are a cross-shaped protrusion and a 1-shaped protrusion, respectively; the side of the cavity of the upper cover of the casing 1 has two trapezoidal cube bosses, the two bosses are located on the longer inner concave boundary; and the two bosses are configured to the snap-fitting with the C-shaped protrusion of the lower cover of the casing 1 for tightly clamping the lower cover of the casing 1.

The lower cover of the casing 1 has a trapezoidal three-dimensional concave thin plate structure, the structure consists of four faces, which are a long face A, a long face B, a ground surface, a short face, the trapezoidal three-dimensional concave thin plate structure has one opening at one end thereof, the ends of the long face A and the long face B where the openings are provided are provided with two bosses, the two bosses have two blind holes, respectively; the lower cover of the casing 1 has the long face A, the portion of the long face B close to the short face has two C-shaped buckles for connecting and tightly clamping the two trapezoidal cubes of two upper covers of the casing 1 to prevent the lower cover of the casing 1 from falling off due to the own weight thereof; the lower cover of the casing 1 has a shaft hole for connecting an inner casing shaft of the refrigerator, and the lower cover of the casing 1 can be rotated clockwise and counterclockwise along the axis, so that the lower cover of the casing 1 is opened and closed.

The groove 2-3 of the filter element water intake sealing ring is located below the water inlet 2-1 for mounting the filter water intake sealing ring 9 and mating with the inner cavity of the connector core 12 to seal the pre-filtration water. The groove 2-4 of the filter element water outtake sealing ring 10 is located on the circumference of the filter body boss for mounting the filter element water outtake sealing ring 10 and mating with the top of the inner cavity of the connector core 12 to seal the post-filtration water. The opening of the filter element end cover 4 is provided with an end cover welding stop port 4-1, the inner side thereof is provided with an inner rib position 4-2, a wrench 4-4 is provided at an anti-slip thread 4-3 and the back side of the filter element end cover 4, the filter element end cover 4 is provided thereon with the anti-slip thread 4-3; the end cover welding stop port 4-1 is located at the opening end of the end cover, cooperates with the body welding stop port and is dissolved, and the axes of the two welding stop ports are the same; the inner rib positions 4-2 of the end cover are evenly distributed inside the filter element end cover 4 for supporting the rib position at the carbon rod bottom 7, the rib positions of the carbon rod bottom 7 and the end cover are embedded with each other. The lower end face of the connecting flange 2-5 is matched with the end face of the connector bottom cover 13 for preventing the filtration system from coining out when the filtration system is under pressure.

Embodiment 2

When used, the present invention rotationally drives a connector core 12 by the rotation of a filter 2 to open a water inlet and a water outlet 2-2 by raising the position of a thimble of the water inlet and the water outlet 2-2 of a connector, thereby opening and closing the connector 3 and a filter element water passage. And the connector 3 is fixed to a filter element by tightly clamping a buckle groove on the connector 3 with a buckle on a connector bracket 14.

When mounted, the filter 2 is inserted into the connector 3 to rotate clockwise until the filter 2 is locked and a water passage is opened. The filter 2 is lifted up, and the connector is lifted by rotating a rotating shaft upward along an arc line so that the buckle and the buckle groove are tightly clamped, and a lower cover of a casing 1 is lifted upward along the arc line to be tightly clamped with an upper cover of the casing 1.

When disassembled, the lower cover of the casing 1 is pressed down along the arc line and separated from the upper cover of the casing 1, the filter 2 is pressed down, the connector is pressed down by rotating the rotating shaft along the arc line, the filter 2 is rotated counterclockwise, and the filter 2 is removed from the connector 3.

When disassembled, the connector 3 is lowered from the position of a boss to the position of a groove, the water passage is closed, preventing the leakage of the water of the connector 3 due to the removal of the filter element. When the filter 2 is mounted and disassembled, a water intake thimble and a water outtake thimble 22 are lifted and lowered so that a water intake thimble sealing ring 19 and a water outtake thimble sealing ring 20 are attached and separated from a water intake thimble sleeve 17 and a water outtake thimble sleeve 18 to perform the sealing. The wear area caused by the opening, closing and sealing of the entire water passage is the heads of a water intake thimble 21 and a water outtake thimble 22, the core groove and the boss. Due to the action of a spring, even if the water intake thimble and the water outtake thimble 22 are severely worn, the water intake thimble sealing ring 19 and the water outtake thimble sealing ring 20 are fitted to the water intake thimble sleeve 17 and the water outtake thimble sleeve 18, realizing the sealing and not causing water leakage.

Embodiment 3

In use, a connector core 12 of the present invention has a groove and a boss thereon, and the connector core 12, a water intake thimble and a water outtake thimble 22 are tightly pressed by a spring, a water intake thimble sleeve 17, a water intake thimble sealing ring 19, a water intake thimble. 21 and a water intake spring 23 are located in a cavity of the water intake thimble 21. The water intake thimble 21 is rotated by the connector core 12, a thimble is lifted and fell through a water inlet boss 3-21 and the groove and by the action of the water intake spring 23, the water outtake thimble sleeve, a water outtake thimble sealing ring 20, and a water outtake thimble 22 and a water outtake spring 24 are located in a cavity of the water outtake thimble 22, and the water outtake thimble 22 is rotated by the connector core 12, the thimble is lifted and fell through a water outtake boss 3-22 and the groove and by the action of the water outtake spring 24, so that a water passage is opened and closed.

The connector core 12 of the present invention has the groove and the boss thereon, and the connector core 12, the water intake thimble and the water outtake thimble 22 are tightly pressed by the spring, when the connector 3 is rotated, the thimbles of a water inlet and a water outlet 2-2 are raised from the position of the groove to the position of the boss so that the water passage is opened for filtration.

The description is only a preferred embodiment of the present invention, and it should be noted that those skilled in the art can also make several improvements without departing from the principles of the present invention, which are in the scope of protection of the present invention.

What is claimed is:

1. A filtration system with a rotating core driving thimble opening and closing water passage, comprising:
    a casing (1),
    a filter (2) and
    a connector (3), wherein the filter (2) and the connector (3) are connected and fixed in the casing (1);
    the casing (1) consists of an upper cover and a lower cover;
    the filter (2) consists of a filter element body, a filter element end cover (4), a carbon rod (5), a carbon rod cover (6), a carbon rod bottom (7), a carbon rod cover sealing ring (8), a filter element water intake sealing ring (9) and a filter element water outtake sealing ring (10); the filter element body is connected to the connector (3); the filter element body is a barrel-shaped structure, the carbon rod (5) is mounted in the filter element body, the carbon rod bottom (7) is mounted at a rear side of the carbon rod (5), the carbon rod cover (6) is mounted at a top of the carbon rod (5), the carbon rod cover sealing ring (8) is fixed at the carbon rod cover (6), the carbon rod bottom (7) is located inside the filter element body,
    one end of the carbon rod bottom (7) is provided with a first inner cavity, and an other end of the carbon rod bottom (7) is provided with a first annular rib position (7-2), the first inner cavity is connected to the carbon rod (5), the first annular rib position (7-2) is embedded into an inner rib position (4-2) of the filter element end cover (4), the filter element end cover (4) is mounted in a rear side of the filter element body, one end of the carbon rod cover (6) has a boss, and an other end of the carbon rod cover (6) has a second inner cavity, a through hole penetrating the two ends and second annular rib positions (6-1) uniformly distributed at four positions, a groove is provided on the boss for mounting the carbon rod cover sealing ring (8), an end surface of the second inner cavity is connected to the carbon rod (5), the through hole is configured for passage of a post-filtration water, the second annular rib positions (6-1) are in contact with a filter element body inner cavity for defining a position of the carbon rod cover (6), a first cavity formed by the carbon rod cover sealing ring (8) and a water outlet (2-2) internally forms a sealing structure for sealing the carbon rod (5);
    the connector (3) consists of a connector body (11), a connector core (12), a connector bottom cover (13), a connector bracket (14), a connector water intake sealing ring (15), a connector water outtake sealing ring (16), a water intake thimble sleeve (17), a water outtake thimble sleeve (18), a water intake thimble sealing ring (19), a water outtake thimble sealing ring (20), a water intake thimble (21), a water outtake thimble (22), a water intake spring (23), a water outtake spring (24), a water intake cover board (25), a water outtake cover board (26), a water intake clamp (27) and a water outtake clamp (28);
    the connector bracket (14) is provided thereon with a C-shaped groove (14-1), the connector body (11) is mounted on an upper side of the connector bracket (14), a rotatable shaft (11-1) is mounted on the connector body (11), the rotatable shaft (11-1) is mounted in the C-shaped groove (14-1), an axis of the rotatable shaft (11-1) is perpendicular to an axis of the connector body (11), the rotatable shaft (11-1) cooperates with the C-shaped groove (14-1), the axis of the rotatable shaft (11-1) is coaxial with the C-shaped groove (14-1), the connector body (11) is capable of rotating along the axis of the rotatable shaft (11-1), and is capable of driving the connector (3) and the filter (2) to oscillate integrally along an arc line;
    the connector body (11) is provided with a water inlet cavity, a water outlet cavity, a water intake thimble cavity, a water outtake thimble cavity, the rotatable shaft (11-1), and a connecting flange (2-5);
    the connector body (11) is connected to the connector core (12), the connector core (12) is located in the connector body (11), and is sealed by the connector water intake sealing ring (15) and the connector water outtake sealing ring (16), the connector core (12), the water intake thimble (21) and the water outtake thimble (22) are pressed by the water intake spring (23) and the water outtake spring (24), the connector core (12) is provided with a water inlet boss (3-21) on which a first arc groove (12-3) is provided, the water intake thimble (21) is lifted up by the rotation of the connector core (12), the connector core (12) is provided with a water outlet boss (3-22) on which a second arc groove (12-4) is provided, the water outtake thimble (22) is lifted up by a rotation of the connector core (12),
    a front side of the filter element body is provided with the water outlet (2-2), the water inlet (2-1) is provided at the circumference of the water outlet (2-2);
    the water inlet (2-1) is connected to the water intake cover board (25), the filter element water intake sealing ring (9) is arranged between the water inlet (2-1) and the water intake cover board (25), the water intake cover board (25) is connected to the water intake clamp (27), the water intake thimble cavity is arranged in the water inlet (2-1); the water intake thimble sleeve (17), the water intake thimble sealing ring (19), the water intake thimble (21) and the water intake spring (23) are mounted in the water intake thimble cavity, the water intake thimble (21) is rotated through the connector core (12), the water intake thimble (21) is lifted and falls through the water inlet boss (3-21) and the first arc groove (12-3) and by an action of the water intake spring (23), so that a water intake passage is opened and closed; the water outlet (2-2) is connected to the water outtake cover board (26), the filter element water outtake sealing ring (10) is arranged between the water outlet (2-2) and the water outtake cover board (26), the water outtake cover board (26) is connected to the water outtake clamp (28), the water outlet (2-2) is provided therein with the water outtake thimble sleeve (18), the water outtake thimble sealing ring (20), the water outtake thimble (22) and the water outtake spring (24), the water outtake thimble (22) is rotated through the connector core (12), the water outtake thimble (22) is lifted and falls through the water outlet boss (3-22) and the second arc groove (12-4) and by an action of the water outtake spring (24) so that a water outtake passage is opened and closed.

2. The filtration system according to claim 1, wherein the filter element water outtake sealing ring (10) is mounted at the water outlet (2-2), the filter element water intake sealing ring (9) is mounted at the water inlet (2-1); the water inlet (2-1) is a set of holes, which are arranged in a ring shape on a top of the filter element body, located below the water outlet (2-2), and located above a filter element water intake sealing ring groove (2-3), the water inlet (2-1) is configured for entering of a pre-filtration water into the filter (2);

the water outlet (2-2) is located on a boss at the top of the filter element body so that the post-filtration water flows out of the filter (2) into the connector (3), a second cavity internally formed by the water inlet (2-1) cooperates with the carbon rod cover sealing ring (8) to seal the pre-filtration water and the post-filtration water to prevent short circuit of the water intake passage.

3. The filtration system according to claim 1, wherein the connector bottom cover (13) is at a lower portion of the connector body (11), the connector bottom cover (13) is provided with a groove flange (13-1) attached to the connecting flange (2-5) of the connector body (11), the connector water intake sealing ring (15) is located in a lower groove (12-2), and the connector water outtake sealing ring (16) is located in an upper groove (12-1).

4. The filtration system according to claim 1, wherein an outer portion of the upper cover has a trapezoidal three-dimensional shape, and a bottom of the upper cover has a rectangular plate-like edge, an upper portion of the trapezoidal three-dimensional shape has laterally and longitudinally distributed reinforcing ribs, the upper cover is provided with two bosses, a first boss of said two bosses is in a central region, and a second boss of said two bosses is at one side of the central region, and centers of the two bosses are on one axis, and the axis is parallel to an edge of the bottom of the upper cover, the first boss consists of a circular boss and a cross-shaped reinforcing rib (1-1), the second boss consists of a circular boss and an 1-shaped reinforcing rib (1-2), one side of the upper cover is provided with a hollow boss (1-3), an external refrigerator water intake pipe and an external refrigerator water outtake pipe are connected to the water inlet (2-1) and the water outlet (2-2) of the connector body (11) of the filtration system through the hollow boss (1-3).

5. The filtration system according to claim 1, wherein a bottom of the upper cover has a trapezoidal three-dimensional concave structure, the trapezoidal three-dimensional concave structure is an upper cover cavity of the casing, the upper cover cavity is configured to accommodate upper portions of the filter (2) and the connector (3), a side of the upper cover cavity of the casing is provided with two trapezoidal three-dimensional bosses (1-4); the two trapezoidal three-dimensional bosses (1-4) are configured for snap-fitting with C-shaped buckles (1-5) of the lower cover to clamp the lower cover.

6. The filtration system according to claim 5, wherein the lower cover has a trapezoidal three-dimensional concave thin plate structure, and the trapezoidal three-dimensional concave thin plate structure consists of four faces, which are a long face A, a long face B, a ground surface and a short face, one end of the trapezoidal three-dimensional concave thin plate structure is open, one end of the long face A and the long face B which is open is provided with two bosses, and each of the two bosses has a blind hole.

7. The filtration system according to claim 1, wherein an end cover welding stop port (4-1) is provided at an opening of the filter element end cover (4), and the inner rib position (4-2) is provided at an inner side of the end cover welding stop port (4-1), a wrench (4-4) is mounted at a rear side of the filter element end cover (4), the filter element end cover (4) is provided thereon with an anti-slip thread (4-3);

the inner rib position (4-2) is configured for supporting the first annular rib position (7-2), and the first annular rib position (7-2) and the inner rib position (4-2) are embedded with each other.

8. The filtration system according to claim 1, wherein the connecting flange (2-5) is located on the connector body (11), a lower end surface of the connecting flange (2-5) cooperates with an end face of the connector bottom cover (13) for preventing the connector core (12) from coming out from the connector body (11) when the filtration system is under pressure.

9. The filtration system according to claim 1, when the connector (3) is rotated, the water intake thimble (21) and the water outtake thimble (22) are raised from positions of the first arc groove (12-3) and the second arc groove (12-4) to positions of the water inlet boss (3-21) and the water outlet boss (3-22), and the water intake passage and the water outtake passage are opened, when the filtration system is disassembled, the connector (3) is lowered from the positions of the water inlet boss (3-21) and the water outlet boss (3-22) to the positions of the first arc groove (12-3) and the second arc groove (12-4), and the water intake passage and the water outtake passage are closed.

* * * * *